United States Patent
Terranova et al.

[19]

[11] Patent Number: 6,065,638
[45] Date of Patent: May 23, 2000

[54] REAL TIME BLENDING APPARATUS AND METHOD

[75] Inventors: Steven N. Terranova, Durham; Seifollah S. Nanaji, Greensboro, both of N.C.

[73] Assignee: Gilbarco Inc., Greensboro, N.C.

[21] Appl. No.: 09/087,287

[22] Filed: May 29, 1998

[51] Int. Cl.[7] .................................................. B67B 7/00
[52] U.S. Cl. ............................. 222/1; 222/63; 222/145.7; 364/500; 364/509; 73/61.43; 73/53.01
[58] Field of Search .................................. 222/52, 63, 71, 222/144.5, 1, 39, 23, 145.7; 73/61.43, 53.01; 364/500, 509

[56] References Cited

U.S. PATENT DOCUMENTS

| | | | |
|---|---|---|---|
| 3,751,644 | 8/1973 | Mayer | 235/151.12 |
| 3,864,095 | 2/1975 | Sinclair et al. | 44/2 |
| 3,999,959 | 12/1976 | Bajek | 44/2 |
| 4,223,807 | 9/1980 | Caswell et al. | 222/28 |
| 4,251,870 | 2/1981 | Jaffe | 364/500 |
| 4,876,653 | 10/1989 | McSpadden et al. | 364/479 |
| 4,963,745 | 10/1990 | Maggard | 250/343 |
| 4,978,029 | 12/1990 | Furrow et al. | 222/1 |
| 5,018,645 | 5/1991 | Zinsmeyer | 222/14 |
| 5,029,100 | 7/1991 | Young et al. | 364/479 |
| 5,038,971 | 8/1991 | Gayer et al. | 222/1 |
| 5,125,533 | 6/1992 | Gayer et al. | 222/28 |
| 5,139,045 | 8/1992 | Ensign | 137/114 |
| 5,203,384 | 4/1993 | Hansen | 141/59 |
| 5,223,714 | 6/1993 | Maggard | 250/343 |
| 5,225,679 | 7/1993 | Clarke et al. | 250/343 |
| 5,257,720 | 11/1993 | Wulc et al. | 222/20 |
| 5,412,581 | 5/1995 | Tackett | 364/498 |
| 5,447,062 | 9/1995 | Kopl et al. | 73/261 |
| 5,469,830 | 11/1995 | Gonzalez | 123/515 |
| 5,569,922 | 10/1996 | Clarke | 250/339.12 |
| 5,606,130 | 2/1997 | Sinha et al. | 73/627 |
| 5,630,528 | 5/1997 | Nanaji | 222/1 |
| 5,706,871 | 1/1998 | Andersson et al. | 141/59 |
| 5,757,664 | 5/1998 | Rogers et al. | 364/509 |

FOREIGN PATENT DOCUMENTS

| | | |
|---|---|---|
| 0 723 929 A1 | 7/1996 | European Pat. Off. . |
| 0 572 621 B1 | 9/1996 | European Pat. Off. . |
| WO 98/15457 | 4/1998 | WIPO . |

OTHER PUBLICATIONS

TLS–305R Business Management and Environmental Compliance System; Copyright 1997.

*Primary Examiner*—Andres Kashnikow
*Assistant Examiner*—Dinh Q. Nguyen
*Attorney, Agent, or Firm*—Coats & Bennett PLLC

[57] ABSTRACT

The present invention relates to an apparatus for dispensing a blended fuel including first and second real time octane sensors in fluid communication with sources of low and high octane blend components. The sensors generate an output signal indicative of the octane level of each component. The apparatus also includes first and second flow control valves in fluid communication with the first and second octane sensors respectively for independently controlling the flow rates of the low level and high level blend components. The invention further includes first and second meters in fluid communication with first and second flow control valves respectively for generating a signal indicative of the flow rates of the first and second blend components. The meters discharge to a blend manifold for mixing the blending components. A controller is provided for receiving outputs from the first and second octane sensors, first and second meters, the blended product octane sensor and generating output control signals to first and second flow control valves so as to maintain the blended fuel octane level at a predetermined level or within a predetermined range. In an alternative embodiment, only a blended product octane sensor is provided downstream of the point at which the blend components are mixed.

16 Claims, 4 Drawing Sheets

REAL TIME BLENDING APPARATUS AND METHOD

FIELD OF THE INVENTION

The present invention relates generally to dispensing systems for delivering a desired blend of two products to a user. More particularly, the invention relates to monitoring on a real time basis the octane level of two fuel components in a blending process to ensure that a properly blended product is produced.

BACKGROUND OF THE INVENTION

Numerous systems have been disclosed for blending two or more fluids during the dispensing of a fluid product. Such systems are used quite often in a service station environment where it is desired to dispense a plurality of different grades or octane levels of gasoline products by blending a high octane level product with a low octane level product to create one or more mid-level octane products. Blending systems offer the potential for savings stemming from reduced storage capacity requirements both at the service station and the bulk plant level. One example of such a system is that disclosed in U.S. Pat. No. 4,876,653 ("the '653 patent"), the contents of which are incorporated herein by reference. The '653 patent discloses a system for blending low and high octane gasoline with the fuel flow rate in each of two fuel flow paths being under individual closed loop control. The system includes an algorithm for comparing the ratio of the actual accumulated volumes of the low octane to the high octane fuel relative to a statistically determined ratio of the ideal volume of the low to high octane fuel for the total accumulated volume of the sum of the volumes of the fuels at a given time. The system provides a very exact blend relative to a pre-selected blend ratio.

Each of the previous systems in this area, including that disclosed in the '653 patent, are based on an important underlying assumption: that the octane levels in the low and high octane fuel storage tanks are correct. Typically, it is assumed that the low octane blend component has an octane of about 86 to 87 and that the high octane component has an octane level of about 92 to 93. Given the octane variability inherent in the refining process, many oil companies add ½ to 1 point of octane to each of the blending components to ensure that each level of blended product meets or exceeds the posted octane rating. This extra octane is referred to as "octane give away" and can be quite costly. Thus, it would be desirable to eliminate the need to boost octane levels of the blending components to ensure that a proper blended product is provided to the customer.

Another potential problem with current octane blending systems is that they have no provision to detect the delivery of an incorrect octane level product in either the high or low level octane blending component storage tanks. That is, if a low octane product is dropped into both the low octane storage tank and to the high octane storage tank, it may not be possible to deliver a proper octane blend under any circumstances. Similarly, if a high octane product is delivered into the low octane product storage tank the station operator will lose an inordinate amount of money due to the "octane give away" occurring for both the blended and the low octane level products. Even if only a partial fuel delivery is dropped into the wrong tank, it may be impossible for a correctly blended product to be created. Thus, it would be desirable to provide a system for monitoring octane levels in blending component storage tanks to alert operators that blending component octane levels are outside desired limits and thus cannot be blended to meet posted octane levels.

Previous blending systems for service station use have not incorporated the actual octane levels of the blend components into the blend control process because no satisfactory octane sensor has been available. In the past octane testing has required a great deal of time to perform using expensive laboratory equipment. Octane sensors that have been available required up to about four minutes to provide an octane reading. The advent of real time octane sensors permits octane level to be included as a control parameter for octane blending in a service station setting. An example of such a sensor is that disclosed in Clarke et al., U.S. Pat. No. 5,225,679 the content of which is incorporated herein by reference. This sensor monitors hydrocarbon-based fuel properties using a mid-IR light source to illuminate fuel in a side stream flow provided for octane monitoring. The light passing through the fuel is received by a narrow bandwidth detector. The molecules of the fuel components are excited by the mid-IR light, and the amount of absorption exhibited by these excited molecules is detected and used to identify the presence of and to quantify the volume percent of the fuel components in solution. This information may be used to determine know properties of the fuel solution to include octane levels.

SUMMARY OF THE INVENTION

The present invention provides a system for monitoring the octane levels of the components of a blended fuel as they are stored and as they are fed into a blending dispenser for two purposes. First, the system ensures that the blending components available in the on-site fuel storage tanks are capable of creating the posted octane levels for blended fuel products. Second, the system uses real time information concerning the octane levels of the product being supplied to the blending system and the blended product to ensure that a properly blended product is produced. The octane level information may be fed directly from octane sensors to an electronic site controller or indirectly from the sensors to some other component of the fueling system and then to the site controller.

In its broadest sense, the present invention relates to a fuel dispensing installation including first and second fuel tanks containing first and second fuels of differing octane levels. Conduits from the first and second tanks are connected to a fuel dispenser, with the fuel dispenser having a blending system for blending the first and second fuels to form a mixture having an intermediate octane. The installation also includes first and second octane sensors to sense the octane levels of the first and second fuels and to output signals representative of the octane levels of said first and second fuels to the dispenser blending system, so that the intermediate octane blend may be achieved using the measured octane levels. The blending system receives the octane sensor output signals and generates output signals to maintain the octane level of the mixture at a predetermined level or within a predetermined range.

In an alternative embodiment, the present invention includes a fuel dispenser installation including first and second fuel tanks containing first and second fuels of differing octane levels, conduits from said first and second tanks to a fuel dispenser, said fuel dispenser having a blending system for blending the first and second fuels to form a mixture having an intermediate octane, and first and second octane sensors to sense the octane of said first and second fuels and to output signals representative of the octane of said first and second fuels to said blending system, whereby the intermediate octane blend may be achieved using the measured octane levels.

In another embodiment, a fuel dispenser installation according to the present invention may include first and second fuel tanks containing first and second fuels of differing octane levels, conduits from said first and second tanks to a fuel dispenser, the fuel dispenser having a blending system for blending the first and second fuels to form a mixture having an intermediate octane, and an octane sensor to sense the octane of said mixture and to output a signal representative of the octane of said mixture as a feedback signal to said blending system, whereby the intermediate octane blend may be achieved in servo fashion using the measured mixture octane.

The present invention may also provide an apparatus including a first real time octane sensor in fluid communication with a source of a low octane blend component for generating an output signal indicative of the octane level of the low octane blend component; a second real time octane sensor in fluid communication with a source of a high octane blend component for generating an output signal indicative of the octane level of the high octane blend component; first and second flow control valves in fluid communication with the first and second octane sensors respectively for independently controlling the flow rates of the low level and high level blend components; first and second meters in fluid communication with first and second flow control valves respectively for generating a signal indicative of the flow rates of the first and second blend components; a blend manifold in fluid communication with first and second meters for blending the low octane blend component and the high octane blend component; and a controller for receiving outputs from the first and second octane sensors, first and second meters, the blended product octane sensor and generating output control signals to first and second flow control valves so as to maintain the blended product octane level at a predetermined level.

The invention also relates to a method for monitoring the blending of a low octane fuel source and a high octane fuel source to create a plurality of desired blended fuel grades including determining on a real time basis the octane level of the low octane fuel source; determining on a real time basis the octane level of the high octane fuel source; comparing the octane levels so determined to predetermined minimum octane levels for each fuel source; determining which of the desired blended fuel grades may be created using the comparison step; and dispensing one of the blended fuel grades that the comparison step indicates may be created.

Fuel dispensing is ceased if the comparison step indicates that none of the desired fuel grades may be created. The method may also include generating an alarm if the comparison step indicates that no desired blended fuel grade may be created. The alarm may be an audible alarm or a visual alarm.

It should be understood that both the foregoing general description and the following detailed description are exemplary and explanatory only and are not restrictive of the invention as claimed. The accompanying drawings, which are incorporated in and constitute a part of this specification, illustrate one embodiment of the invention and, together with the description, serve to explain the principles of the invention.

DESCRIPTION OF THE PREFERRED EMBODIMENTS

In the description that follows, like numbers are used to describe like components throughout the various views and for multiple embodiments.

Figure 1:
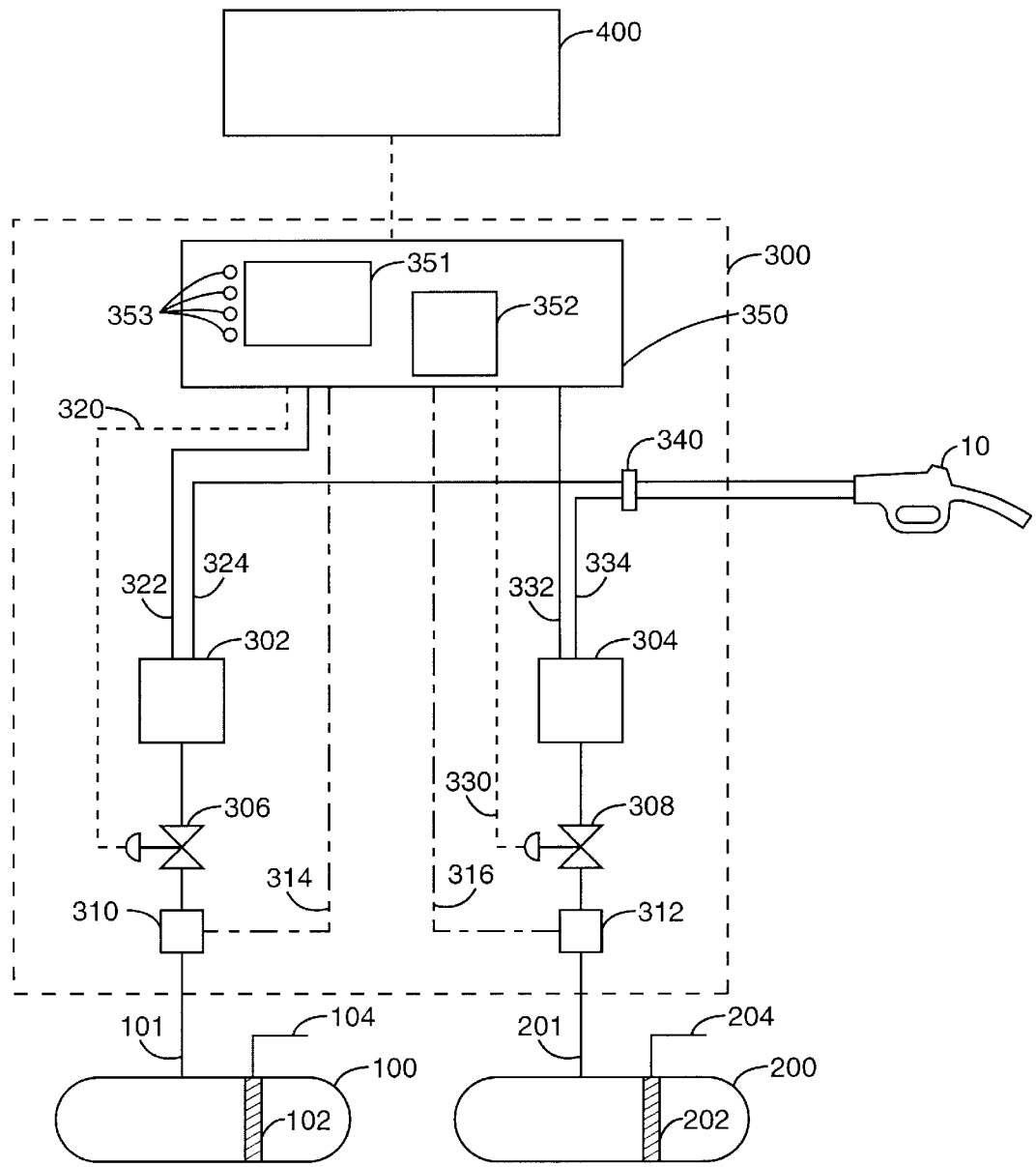
FIG. 1 is a block diagram of one embodiment of the present invention that includes separate real time octane sensors in fluid communication with a low octane blend component and a high octane blend component.

A preferred embodiment of the present invention shown in FIG. 1 includes low octane product source 100 containing a low octane blend component, high octane product source 200 containing a high octane blend component, fuel dispenser 300, and site controller 400 in electronic communication with fuel dispenser electronics 350. Site controller 400 provides means for operating personnel to monitor and control the operation of fuel dispenser 300 and the octane level in fuel sources 100,200. It should be understood that although only one fuel dispenser 300 is shown in FIG. 1, a typical installation would include several dispensers in fluid communication with each fuel source 100,200 and in electronic communication with site controller 400, as is well known in the art.

Fuel dispenser 300 is in fluid communication with product sources 100,200 via supply lines 101,201 and includes a customer display 351, an octane level display 352 and product blend selectors 353 for customer use to select the blended product desired for a particular transaction. The other components of fuel dispenser 300 include first and second real time octane sensors 310,312 for providing signals 314,316 indicative of the octane level of first and second products respectively. First and second flow control valves 306,308 downstream of octane sensors 310,312 control the flow rate of first and second products, respectively. First and second flow meters 302,304 connected to flow control valves 306,308 provide electronic signals 322,332 to dispenser electronics 350 indicative of the flow rate of a first and second products, respectively. Product flow lines 324, 334 provide paths for delivery of each of the first and second products to blend manifold 340 and then to nozzle 10. As is well known in the art, nozzle 10 is connected to dispenser 300 via a flexible hose. First and second flow control valves 306,308 are controlled by dispenser electronics 350 via signal lines 320,330 respectively. Various other components such as fuel filters, check valves, solenoids and the like may also be provided as necessary.

Figure 2:
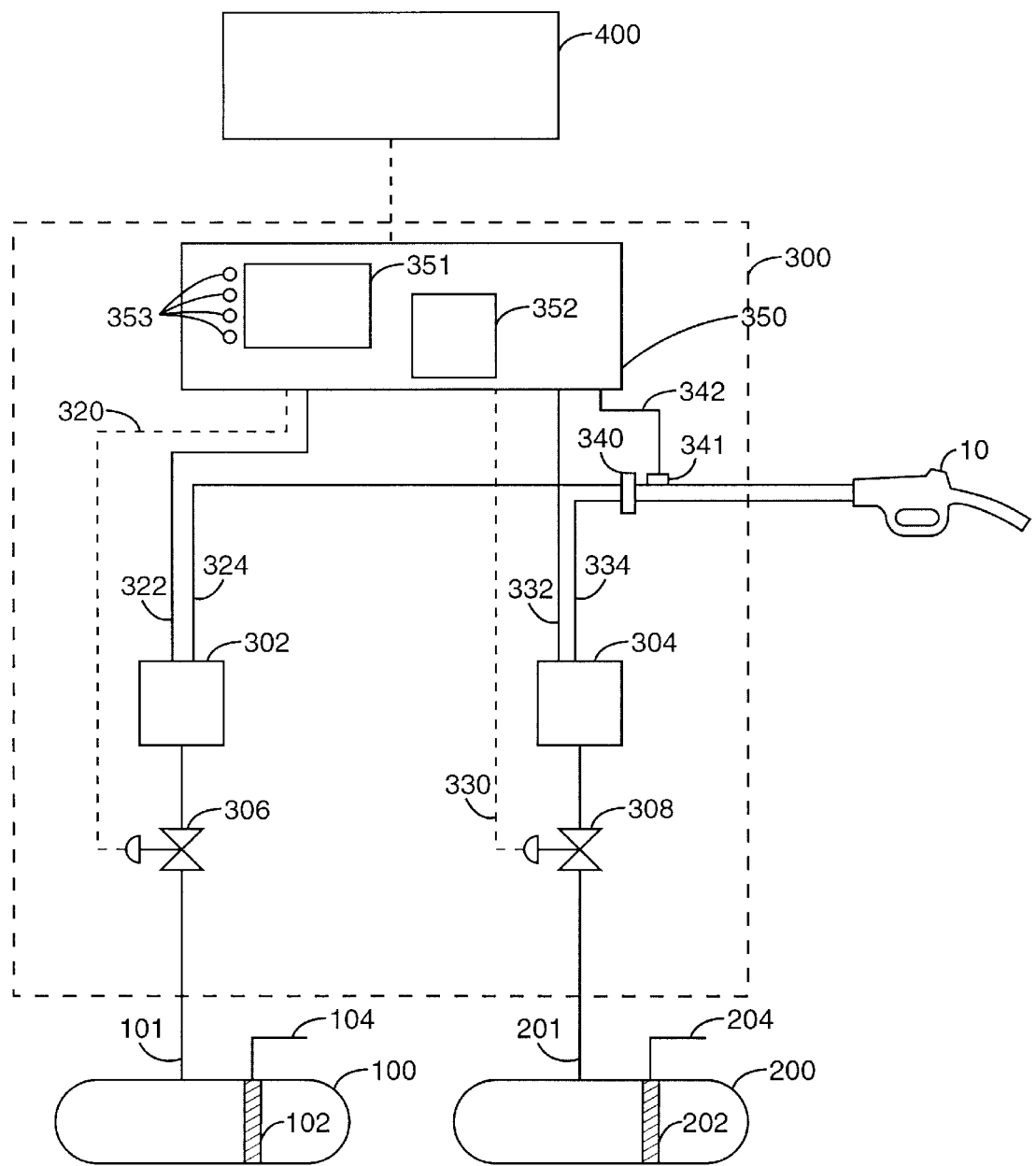
FIG. 2 is a block diagram of an alternative embodiment of the present invention that includes a single blended fuel octane level sensor located downstream of the point at which the low octane and high octane blend components are mixed to form a blended fuel.

An alternative embodiment of the present invention is shown in FIG. 2. This embodiment is the same as that shown in FIG. 1 except that only one octane sensor 341 is provided downstream of blend manifold 340. Sensor 341 provides an output signal 342 to dispenser electronics 350 indicative of the octane level of the blended product being provided by the dispenser.

Either system described within FIGS. 1 and 2 may be provided with additional octane sensors 102,202 in product sources 100,200. These additional sensors can act as a backup to the dispenser-generated signals by providing output signals 104,204 to site controller 400 for monitoring the availability of suitable fuel blending components. Given their secondary, backup usage, these sensors need not be real time sensors as defined herein.

The term "real time octane sensor" as used herein means an octane sensing device capable of determining the octane level and transmitting a signal indicative of the octane level of a gasoline fluid to a dispenser controller or to some other device. The sensor must be capable of performing this function fast enough to enable the dispenser controller to correct a blending process continuously within the time span of a typical retail transaction. The scope of the present invention includes the use of currently known octane sensors and those that may be developed in the future so long as they meet this performance requirement.

Figure 3:
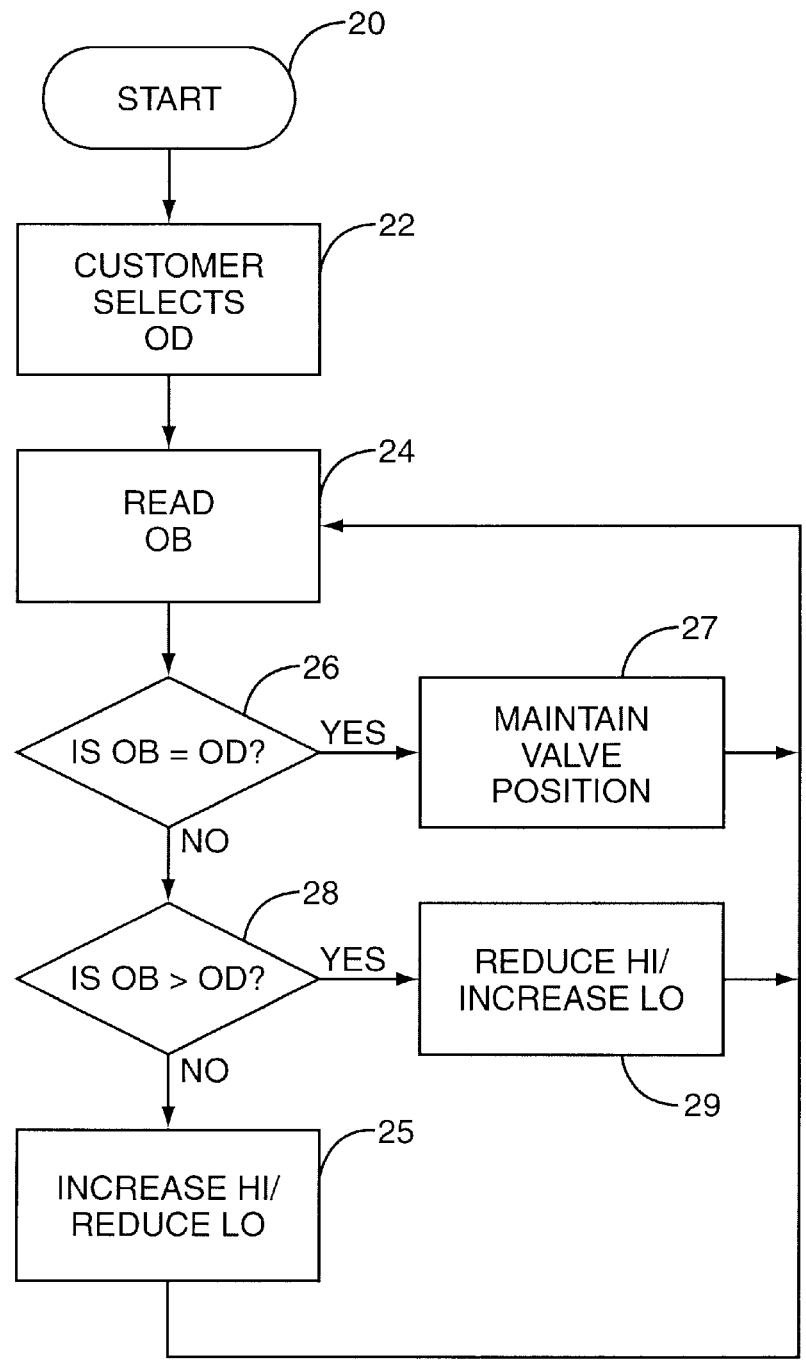
FIG. 3 is a flow chart illustrating a first embodiment for controlling the blending process in a service station setting using one or more octane level sensors.
Figure 4:
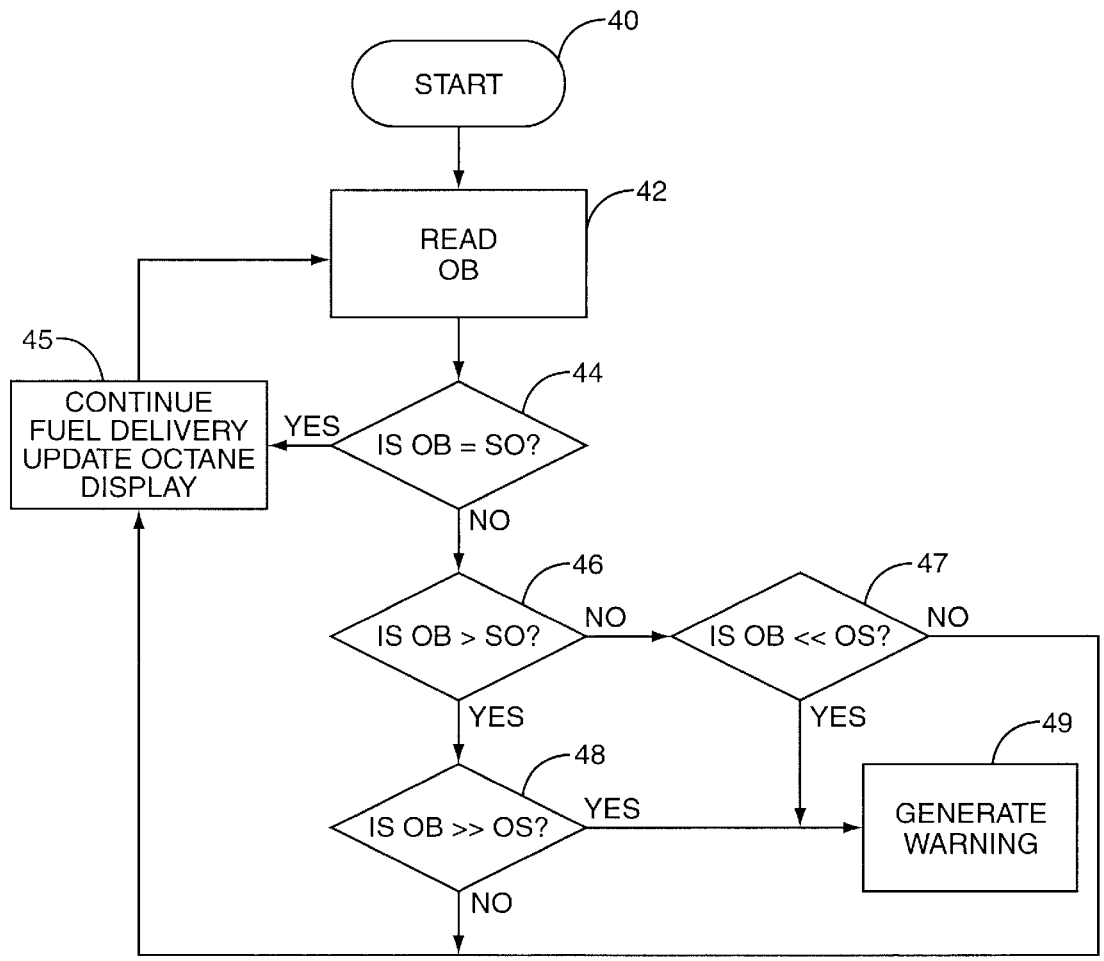
FIG. 4 is a flow chart illustrating an alternative embodiment for controlling the blending process in a service station setting using one or more octane level sensors.

The flow charts shown in FIGS. 3 and 4 illustrate particular embodiments of using octane sensors in a fuel dispenser blending operation according to the present invention. Each of these embodiments may be described generally as a fuel dispenser installation including first and second fuel tanks 100,200 containing first and second fuels of differing octane levels, conduits 101,201 from first and second tanks 100,200 to a fuel dispenser 300. The fuel dispenser has a blending system for blending the first and second fuels to form a mixture having an intermediate octane. The installation further includes first and second octane sensors 102, 202 to sense the octane levels of the first and second fuels and to output signals representative of those levels to the blending system such that the intermediate octane blend may be achieved using the measured octane levels.

The symbols used in the flow chart are defined as follows:

"OD" and "SO" each refer to the octane level of the product selected by the customer. This product may be a low octane product or high octane product which may require no blending or may be one or more mid-octane products which require blending.

"OB" means the octane of the blended product leaving the dispenser as read by blend octane sensor 341. OB should be equal to or close to the value of OD when the blending system is operating properly.

"LO" and "HI" refer to the low octane blending component and the high octane blending component respectively.

Referring now to FIG. 3, the blend control process is entered at 20 and proceeds to 22 where the customer selects the fuel and the octane level to be delivered. In this example, the mid-octane product has been selected. Next, as fuel delivery begins, dispenser electronics 350 reads the octane level of the blended product using the blend octane sensor 341. At test 26 OB is compared to OD. If the two values are equal then the routine proceeds to 27 where flow control valves 306,308 are left in their current positions and the routine returns to 24 to read the octane level of the blended product again. It should be understood that at test 26 the values of OB and OD need not be identical to satisfy the test. There may be room for a small amount of variants between the two values while still satisfying the tests due to instrument error and as may be allowed by regulatory authorities.

If test 26 answers no, then the routine proceeds to test 28 where OB is again compared to OD to determine whether OB is greater than OD. If this test answers yes, then the routine proceeds to 29 where flow control valves 306,308 are controlled to either reduce the amount of high octane blended component or increase the amount of low octane blending component making up the blended product. Either action may be used singly or in combination to correct the octane level of the blended product. If test 28 answers no, then the routine proceeds to 25 where flow control valves 306,308 are controlled to increase the amount of high octane blending component and/or reduce the amount of low octane blending component being supplied.

An alternative embodiment is described in the flow chart shown in FIG. 4. The process here starts at 40 and proceeds to 42 where dispenser electronics 350 reads the output of blend octane sensor 341. At the same time SO is read from a memory location. At test 44 OB is compared to SO. If the two values are not equal the routine proceeds to test 46 where OB is again compared to SO to determine whether OB is greater than SO. If this test answers no, then the routine proceeds to 47 where it is determined whether the value of OB is so far below that of SO as to exceed a predetermined limit. This difference between the values could relate to the tolerance and octane level permitted by regulatory authorities. If this test answers no, then the routine proceeds to block 45. If this test answers yes, then the routine proceeds to block 49 where a warning to operating personnel is generated. The routine could include the additional step at this point of stopping fuel delivery if OB is too far out of tolerance.

If the result of test 46 is yes, then the routine proceeds to test 48 where it is determined whether the value of OB exceeds the value of SO by a predetermined amount. If this test answers yes, then the routine proceeds to block 49 as described above. If this test answers no, then the routine proceeds to block 45 which permits the fuel delivery to continue but updates the octane display for the customer to show that an octane level higher than that selected is being provided. The system could also incorporate memory provided to record all occurrences of a higher octane product being dispensed than was actually selected. A record of such occurrences can be used by regulatory authorities to monitor blending performance and also may be used by operators to make appropriate adjustments.

The present invention may operate either on a stand alone basis or concurrently with other known blending systems. When operating with other systems the present invention may act as a monitor on the octane level of the blended product. Thus when a malfunctioning control valve or meter causes improper blending that cannot be detected by prior art control systems, the present invention can alert operators to the condition. The override feature involves opening or closing control valves beyond the amount specified by a prior art control system. If a maximum amount of override control fails to bring the octane level of the blended product back to within tolerances, the present invention would cease the fueling operation and alert operators.

As alluded to above, equipment malfunctions such as internal meter leakage, meter calibration problems, valve failures and piping leaks can cause even a properly functioning prior art blending system to fail to deliver the desired octane level product. Certain aspects of the present invention may be incorporated into existing blending dispenser systems to address these situations. For instance, an blend octane sensor 341 may be provided for comparing the actual octane level of the blend to that selected by the customer. This information may be displayed to the customer during fueling as an assurance that the desired fuel grade is being delivered. If the actual octane level falls below that selected by the customer, dispenser electronics 350 can shut down the fueling operation and notify operating personnel via site controller 400.

It will be readily appreciated that the comparison steps described above encompass comparing a measured octane level not only to a single predetermined value but also to a range of values. Given the measurement error inherent in any instrument, it may be feasible to compare the measured octane value to determine whether it falls within a certain range of values. The scope of the present invention includes making the comparison steps described above using either a single point value or an octane range.

Historical information concerning the octane levels of both blending components and blended products may be stored in dispenser electronics 250, site controller 400 or other storage device for compliance monitoring by weights and measures authorities. These authorities may monitor octane levels from a remote location via a communications link with site controller 400. The advantages of such remote monitoring include reduced costs of compliance inspections and the ability to conduct unannounced monitoring checks on octane levels being delivered to the public.

The various components of the system described above may be combined in a variety of ways depending on the desired performance objectives. For example, if costs are a concern, dispenser 300 may be provided with only the blend octane sensor 341 and not with first and second octane sensors 310,312. The signal from blend octane sensor 341 is used by dispenser electronics 350 along with flow rate information from first and second meters 302,304 to generate output signals to flow control valves 306,308. In this embodiment sensors on the inlet side of first and second meters 302,304 are not required. Conversely, octane monitoring may be conducted only on the inlet side of first and second meters 302,304 using first and second octane sensors 310,312 without monitoring the blended product. It will be readily apparent to one of ordinary skill in the art that octane level sensing may be incorporated into a dispenser blending process by either: 1) monitoring the octane level of the blended product without regard to the octane level of the incoming blend components or 2) monitoring the octane levels of the blend components without regard to the octane level of the blended product.

Although the present invention has been described with preferred embodiments, it is to be understood that modifications and variations may be utilized without departing from the spirit and scope of this invention, as those of skill in the art will readily understand. Such modifications and variations are considered to be within the purview and scope of the appended claims and their equivalents.

I claim:

1. A fuel dispensing installation comprising
   a) first and second fuel tanks containing first and second fuels of differing octane levels,
   b) conduits from said first and second tanks to a fuel dispenser, said fuel dispenser having a blending system for blending the first and second fuels to form at least one mixture having an intermediate octane, and
   c) first and second real time octane sensors mounted in the fuel dispenser so as to be in fluid communication with the first and second fuels respectively to sense the octane levels of said first and second fuels and to output signals representative of the octane levels of said first and second fuels to said blending system,
   wherein the blending system receives the octane sensor output signals and generates output signals to maintain the octane level of the at least one mixture at a predetermined level or within a predetermined range.

2. The fuel dispensing installation of claim 1 further comprising a third octane sensor for detecting the octane level of the intermediate octane mixture.

3. The fuel dispensing installation of claim 1 further comprising an octane level display for displaying the actual octane level of the mixture having an intermediate octane level.

4. An apparatus for dispensing a blended fuel comprising:
   a) a first real time octane sensor in fluid communication with a source of a low octane blend component for generating an output signal indicative of the octane level of the low octane blend component;
   b) a second real time octane sensor in fluid communication with a source of a high octane blend component for generating an output signal indicative of the octane level of the high octane blend component;
   c) first and second valves in fluid communication with the first and second octane sensors respectively for independently controlling the flow rates of the low level and high level blend components;
   d) first and second meters in fluid communication with first and second valves respectively for generating a signal indicative of the flow rates of the first and second blend components;
   e) a blend manifold in fluid communication with first and second meters for blending the low octane blend component and the high octane blend component to create a blended fuel; and
   f) a dispenser controller for receiving outputs from the first and second octane sensors, and the first and second meters, and generating output control signals to first and second valves so as to maintain the blended product octane level at a predetermined level or within a predetermined range.

5. The apparatus of claim 4 further comprising a site controller in electronic communication with the dispenser controller.

6. The fuel dispensing installation of claim 4 further comprising an octane level display for displaying the actual octane level of the mixture having an intermediate octane level.

7. An apparatus for dispensing a blended fuel comprising:
   a) first and second valves in fluid communication with a low octane blend component and a high octane blend component respectively for independently controlling the flow rates of the low level and high level blend components provided to the apparatus;
   b) first and second meters in fluid communication with first and second valves respectively for generating a signal indicative of the flow rates of the first and second blend components;
   c) a blend manifold in fluid communication with the first and second meters for blending the low octane blend component and the high octane blend component to form a blended fuel;
   d) a blended fuel real time octane sensor in fluid communication with the blend manifold for generating an output signal indicative of the octane level of the blended fuel; and
   e) a dispenser controller for receiving outputs from the first and second meters and the blended product octane sensor and generating output control signals to first and second valves so as to maintain the blended product octane level at a predetermined level.

8. The apparatus of claim 7 further comprising a site controller in electronic communication with the dispenser controller.

9. The fuel dispensing installation of claim 7 further comprising an octane level display for displaying the actual octane level of the mixture having an intermediate octane level.

10. A method for monitoring the blending of a low octane fuel source and a high octane fuel source to create a desired fuel including at least one desired blended fuel grade and at least one non-blended fuel grade comprising:

a) determining on a real time basis the octane level of the low octane fuel source;

b) determining on a real time basis the octane level of the high octane fuel source;

c) comparing the octane levels determined in steps a) and b) to predetermined minimum octane levels for each fuel source;

d) determining which of the desired blended and non-blended fuel grades may be created using the results of comparison of step c); and e) permitting the dispensing of each blended fuel grade that the results of comparison of step c) indicate may be created.

11. The method of claim 10 further comprising ceasing fuel dispensing if the comparison of step c) indicates that the desired fuel grade cannot be created.

12. The method of claim 10 further comprising generating an alarm if the comparison of step c) indicates that the desired fuel grade cannot be created.

13. The method of claim 12 wherein the alarm is an audible alarm.

14. The method of claim 12 wherein the alarm is a visible alarm.

15. The method of claim 12 wherein the alarm is an offsite alarm.

16. The method of claim 13 further comprising displaying the actual octane level of the blended fuel grade.

* * * * *